United States Patent
Koorapaty et al.

(10) Patent No.: US 6,801,778 B2
(45) Date of Patent: Oct. 5, 2004

(54) EFFICIENT LOCATION OF MOBILE RADIOTELEPHONES USING CELLULAR AND GPS INFORMATION

(75) Inventors: Havish Koorapaty, Cary, NC (US); L. Scott Bloebaum, Cary, NC (US)

(73) Assignee: Ericsson Inc., Research Triangle Park, NC (US)

(*) Notice: Subject to any disclaimer, the term of this patent is extended or adjusted under 35 U.S.C. 154(b) by 699 days.

(21) Appl. No.: 09/773,318

(22) Filed: Jan. 31, 2001

(65) Prior Publication Data
US 2002/0102992 A1 Aug. 1, 2002

(51) Int. Cl.[7] .............................................. H04Q 7/20
(52) U.S. Cl. ....................... 455/456.1; 455/404.2; 455/414.2; 342/357.06; 701/213
(58) Field of Search ................ 455/414.2, 404.2, 455/440, 456.1–456.6, 457; 342/357.01–357.04, 357.06, 357.08, 357.1, 357.12, 357.15; 701/213

(56) References Cited

U.S. PATENT DOCUMENTS

| | | | |
|---|---|---|---|
| 4,718,081 A | * | 1/1988 | Brenig ........................ 455/438 |
| 5,365,450 A | | 11/1994 | Schuchman et al. |
| 5,418,538 A | | 5/1995 | Lau |
| 5,774,829 A | * | 6/1998 | Cisneros et al. ............. 701/213 |
| 5,883,594 A | | 3/1999 | Lau |
| 5,983,109 A | * | 11/1999 | Montoya .................. 455/456.2 |
| 5,999,125 A | * | 12/1999 | Kurby ....................... 342/357.1 |
| 6,067,045 A | * | 5/2000 | Castelloe et al. ......... 342/357.09 |
| 6,134,483 A | * | 10/2000 | Vayanos et al. ............... 701/13 |
| 6,141,558 A | * | 10/2000 | Chen ........................ 455/456.1 |
| 6,252,543 B1 | * | 6/2001 | Camp .................... 342/357.06 |
| 6,256,475 B1 | * | 7/2001 | Vannucci .................... 455/12.1 |
| 6,266,533 B1 | * | 7/2001 | Zadeh et al. ............. 455/456.2 |
| 6,429,811 B1 | * | 8/2002 | Zhao et al. ............ 342/357.09 |

* cited by examiner

Primary Examiner—William Trost
Assistant Examiner—Stephen D'Agosta
(74) Attorney, Agent, or Firm—Coats & Bennett, P.L.L.C.

(57) ABSTRACT

The invention specifies various methods for the provision or calculation of a reference location for GPS-equipped mobile communications devices, specifically, GPS-equipped cellular phones. This is accomplished by providing certain GPS-related information over the cellular network, and by calculating reference locations based on various criteria, aided by actual position fixes provided by the built-in GPS receiver.

9 Claims, 1 Drawing Sheet

EFFICIENT LOCATION OF MOBILE RADIOTELEPHONES USING CELLULAR AND GPS INFORMATION

FIELD OF THE INVENTION

Figure 1:
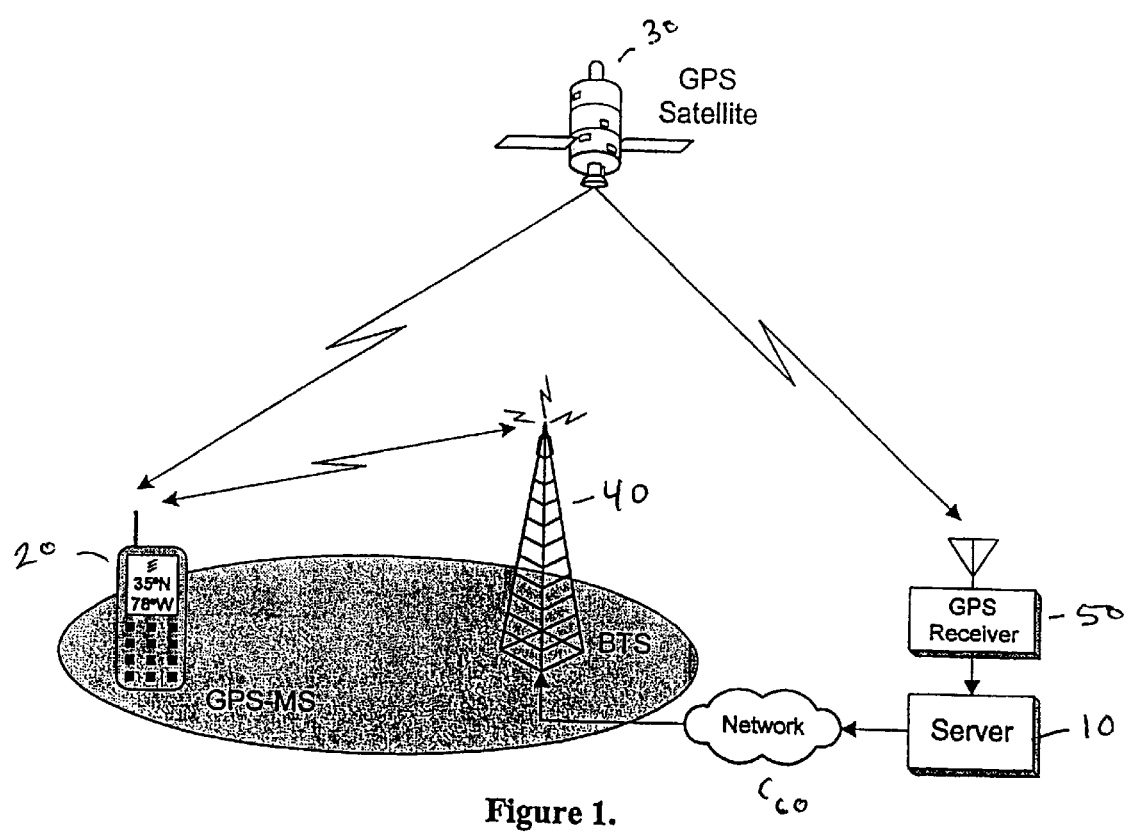

This invention is related to cellular telephones and, in particular, to cellular telephones equipped with the capability of determining their location using the Global Positioning Satellite (GPS) system.

BACKGROUND OF THE INVENTION

It is required for cellular telephone operation for a cellular phone to be aware of what cell it is located within. Cells in the cellular telephone system refer to the area covered by singular cellular tower, and can overlap. While the area in a cell is covered by a single tower, a tower may support multiple cells when sectored antennae are used at the tower. In general, a cellular phone will monitor the control channel of the cellular tower having the strongest signal. Therefore, a cellular phone has a rudimentary knowledge of its location, but not necessarily in terms of latitude, longitude and altitude.

However, there are applications, other than the normal voice communications capabilities of the cellular phone, that may require a more exact knowledge of the phone's location within a cell. These include, for example, an application providing location sensitive advertising over the cell phone, wherein targeted advertising could be sent to cell phone users within a certain proximity of the advertiser's location. Other such applications would be the provision of travel directions based on current location and enhanced 911 emergency services from calls made using a cellular phone. As a result, it is known to combine a cellular phone with GPS receiver in a single unit and to allow applications to request that the GPS receiver provide the current position of the unit to the applications, either periodically or upon request of the application.

To improve certain characteristics of its performance, such as time-to-first-fix and sensitivity, it is possible to provide the GPS receiver with various aiding information, such as satellite ephemeris, approximate time and reference location. The reference location is an approximation or estimate of the receiver's current position, which, when used with other information, allows the receiver to determine which satellites should be visible and to estimate the signal transit times from the respective satellites. Generally, without this aiding information, acquiring the satellite signals and computing the receiver's exact location could take much longer. This delay could have a serious impact on the performance of mobile location-based services, which tend to be time-sensitive.

Further, it is possible that there are certain locations, such as when the receiver is indoors, where the signal strength from the GPS satellites is not strong enough to provide a location fix. In these circumstances, the reference location could provide a rough estimate of location.

It is therefore desirable to provide a means by which a reference location can be provided to a GPS receiver which is integrated into a cellular phone.

SUMMARY OF THE INVENTION

The invention provides a means whereby the reference location for the GPS receiver can be computed to a higher degree of accuracy using information provided over the cellular network, such as the location of the cellular tower, the current positions of the GPS satellites, and the GPS time reference, and also using positions previously determined using actual fixes from the GPS receiver.

In particular, at selected times when a GPS equipped cell phone is operating in idle (non-call) mode receiving a control channel being broadcast on a particular cellular system, the cell phone uses the GPS receiver to compute its own position. These position computations are associated with the control channel to obtain an approximate location for the cell. The positions are also associated with the neighboring control channels that the cell phone is able to receive and with the signal strengths of the received signals. This allows the cell phone to increase the accuracy of reference locations and differentiate between locations within a cell by using "neighbor lists". The accuracy is thereby increased beyond the granularity of the cell but still is not as accurate as the instantaneous position that may be computed by the GPS receiver when an actual position is needed. The accuracy, however, aids the receiver in more quickly computing the precise locations when needed.

The invention also uses the GPS receiver to compute a position when a private system not broadcasting a reference location is detected by the cell phone. Private systems are often located in an indoor environment, where signals from the GPS satellites may be undetectable. When the cell phone detects that it is in the vicinity of a private system, the the cell phone tracks its position until the signals from the GPS satellites are no longer detectable. The last recorded position is then used as a reference location estimate for applications when the cell phone is indoor and in contact with the private system.

The invention also allows the cell phone to form an estimate of the size of the cell which helps to determine if the reference location of the cell is accurate enough for a particular application. Thus, reducing the number of times the GPS receiver needs to be used.

The message described in this invention may therefore be used to first increase the performance of location estimation when a reference location is unavailable and second, to increase the accuracy of a provided reference location without having to use a GPS receiver in real time to obtain the location fix. The GPS receiver is used to obtain location information for a cell during a prior learning phase. The information obtained is stored in the memory of the cell phone and may be later used for higher accuracy location estimates without having to turn on the GPS receiver to get a real time location fix.

DETAILED DESCRIPTION OF THE DRAWINGS

FIG. 1 is a schematic diagram of the system of the current invention showing the flow of information and communication channels.

DETAILED DESCRIPTION OF THE INVENTION

There are some significant advantageous to integrating a GPS receiver with a cellular telephone. In particular, the cell phone can take advantage of the communication link with the network to improve the performance of the integrated GPS receiver. The fundamental concept is to capture the necessary GPS information from GPS receivers at various points within the cellular network and to deliver this information to the cell phone via existing point-to-point or broadcast bearers in the network. The integrated GPS receiver utilizes the information as assistance to reduce or eliminate the uncertainty in the characteristics of the received signals from the GPS satellites, thereby improving time to first fix and sensitivity. A diagram of the basic concept is shown in FIG. 1.

According to FIG. 1, the GPS-equipped cell phone 20 receives the assistance from a server 10 connected to a GPS receiver 50, from the cellular network 60 via the local radio base station 40. The assistance may include the provision of information such as approximate location (reference location) of the cell phone, visible satellites 30 at that approximate location, and information such as the ephemeris and almanac describing the orbits of satellites 30. Preferably, cell phone 20 also receives approximate GPS time from server 10.

Almanac and ephemeris data can be provided to GPS-equipped cell phone 20 from server 10 in the system without knowledge of the reference location of the GPS-equipped cell phone 20. Knowledge of a crude reference location would enable server 10 to send the data only for the satellites 30 that are expected to be visible at the time of the position fix, but this knowledge is not required. However, provision of the reference location and knowledge of the approximate time enables cell phone 10 to significantly reduce its time-frequency search space for synchronizing to the satellite signals and therefore the time to first fix.

While provision of the reference location via cellular network 60 is being standardized for all the major cellular radio networks, the availability of the reference location may be subject to delays or gaps in deployment. The techniques presented in this invention enable GPS-equipped cell phone 20 to avail of a reference location in such cases and operate the GPS receiver with a high degree of efficiency and performance. Further, even when the reference location is available, the invention allows efficient use of the GPS receiver by providing techniques for computing a low accuracy position that is an improvement of the reference location without using the GPS receiver. This can be used to address applications that have low quality of service requirements in terms of position accuracy. One of these techniques involves using an estimate of the cell size among other factors to determine if the reference location used meets the quality of service requirements. The invention also allows independent position estimation when utilizing a private system that is indoors.

When receiving a cellular control channel while operating in idle mode, GPS-equipped cell phone 20 captures a neighbor list that includes the control channels of surrounding cells that GPS-equipped cell phone 20 must monitor. If certain criteria, including the differences in the received signal strengths between the current and monitored control channels, are met for any of the monitored channels, then cell phone 20 selects the monitored channel as its current channel and operates using a new neighbor list. This process of selecting a different control channels based on dynamic changes in signal conditions, caused by mobility among other things, is called re-selection.

Computing Reference Locations for Cells with No Availability of Reference Locations.

In one aspect of the invention, a procedure is disclosed for computing the reference location corresponding to a particular cell. It should be noted that all the position estimates referred to are obtained using the GPS receiver in GPS-equipped cell phone 20. When no reference location is available for a particular cell, GPS-equipped cell phone 20 determines a suitable reference location using multiple positions previously recorded for a particular cell using the GPS receiver instead of just storing a single position that was measured when camping on the control channel of a particular cell. In general, any suitable method of processing the previously-stored positions may be used to obtain the reference location. For example, the previously-recorded position may be averaged to obtain the reference location, or one of the previously recorded positions may be chosen as a reference location. The multiple positions do not have to be recorded close to each other in time; the positions may have been recorded for that particular cell over multiple days.

GPS-equipped cell phone 20 should only average positions that meet certain qualifying criteria. First, when a position is recorded, GPS-equipped cell phone 20 monitors the cell identifier of the control channel being received for a pre-determined period of time T (e.g., T=5 minutes). Cell phone 20 must choose the cell identifier for which the control channel was received at least some portion of T (e.g., 80%). If no channel meets that criterion, then the position is not used. Second, if the GPS-equipped cell phone 20 has access to the results of a Doppler estimator, this criterion is applied. The estimated Doppler frequency is proportional to the speed at which the cell phone is moving, and thereby can be used to detect fast movements of the cell phone. When a position is recorded, the GPS-equipped cell phone 20 also records the results from the Doppler estimator. Positions that were recorded when the Doppler was below some threshold (e.g., 5 Hz) are used, if available.

Refining Reference Locations Using Received Powers from Neighboring Cells

In a second aspect of the present invention, GPS-equipped cell phone 20 may estimate a more accurate initial position by correlating positions computed using the GPS receiver in the phone within the current cell and received signal strength of the current cell and the neighboring cells with the L highest received signal strength values that are over a given minimum threshold. Timing advance (i.e., transmission delay from base station) for the current cell, if known, also can be attached to the computed position in the database. The novel aspect of this embodiment is the dynamic building of such a data base using the GPS receiver in the phone. In one embodiment of the invention, a number of positions that have the same channel as the current channel and the same list of L highest received signal strength neighbors can be averaged to obtain a better position.

In another embodiment, the criteria above can be made narrower. For example, positions may be categorized by the sequence of the L channels in the list in ascending order of received signal strength values. All positions corresponding to the same current channel and the same ordered list of L channels with highest received signal strength are then averaged to obtain a position.

In other embodiments, the current channel and the set of neighbors within a certain received signal strength range are used to categorize positions. It is clear that further variations of such criteria are possible. For example, the current channel and the actual received signal strength values for neighboring cell channels can be used to categorize positions.

Refining reference locations using received signal strength information for neighboring-cell control channels would allow GPS-equipped cell phone 20 to determine a coarse estimate of its position using the current received power of the base station transmissions from the current and neighboring cells. This method builds a database of received signal powers at various positions using a much higher accuracy receiver (GPS) and averaging positions belonging to certain power profiles for the current and neighboring control channels. This increases the accuracy compared to simple power based methods because the database is compiled using a highly accurate GPS receiver. The advantage of this technique is that the GPS receiver need not be turned on for real-time computation in many applications that do not require high accuracy, but require an accuracy greater than that enabled by a pure power based method or reference location method. The advantage is reduced power consumption by using previously computed positions to simplify the current or future computation of position results.

In another aspect of the invention, if the base station locations are known, a power based location method that uses the received signal strength of the neighboring cells without utilizing the GPS receiver can be used to compute the reference location whenever it is needed. However, as stated above, the techniques described earlier that use the GPS receiver are expected to achieve better reference location estimates.

Use of Cell Size to Decide if Use of GPS Receiver is Required for a Particular Application An estimate of cell size may be obtained by looking at the variance of recorded positions when receiving the control channel of a particular cell, especially when the positions are recorded before a handoff to another cell. The position estimates used should be compiled over a long period of time such as many hours or even days. This allows GPS-equipped cell phone 20 to estimate whether a GPS estimate is required or not for a given application given the cell identifier that GPS-equipped cell phone 20 is currently seeing on the control channel. It also aids GPS-equipped cell phone 20 in estimating if refined reference locations generated by it may meet the quality of service criteria of a particular position request. In effect, the phone is able to learn the movement patterns of the user. Hence, even when the actual cell size is large, if the location estimates corresponding to the cell are concentrated in an area, the phone may use these positions to provide the user's position with greater accuracy than the cell size. Hence, the computed cell size can be thought of as being personalized to the user's movement patterns.

Position Estimates for Indoor Private Systems when an Estimate is Not Available from the Private System This invention provides a technique to provide position information when in the vicinity of a private system that is indoors when the private system does not broadcast any reference location. This is done as follows. When GPS-equipped cell phone 20 recognizes that it is close to a private system (e.g., via mechanisms existing in standards to detect private systems when receiving public-system control channels), it uses the GPS receiver to track the position of the user from the time it switches to the private system until it loses the signal from GPS satellites 30 (GPS satellites 30 have poor coverage in indoor environments). The last recorded position is then used as a position for the private system cell or cells on which it camps. If the signals from GPS satellites 30 are not lost, then the phone assumes that the private system is not an indoor system and the private system cells are treated the same way as the public ones. This allows GPS-equipped cell phone 20 to learn about the positions of private systems even when these private systems do not broadcast a reference location.

The foregoing invention has been described in terms of usage with a typical cellular telephone network. The invention, however, is not meant to be limited to any single implementation of a cellular network. Various standards for second-generation cellular radio networks, such as GSM, TDMA and cdmaOne, incorporate assistance for GPS-equipped cellular phones. Furthermore, the invention, need not be limited to cellular radio networks. The invention could be implemented using any GPS-equipped mobile communications device. Therefore, the scope of the invention is embodied in the following claims.

We claim:

1. A method for computing a reference location for a mobile communications device having a GPS receiver and connected to a communications network comprising the steps of:

identifying a point of connection to said communications network; recording, over time, a plurality of actual position readings from said GPS receiver qualifying said actual position reading by:

monitoring said identified point of connection for a predetermined period of time after recording each position reading;

determining the percentage of said predetermined time period that said mobile communications device was connected to said communications network at said identified point of connection; and discarding any position readings recorded from said GPS receiver during said predetermined time period if said percentage is below a set threshold value;

correlating said qualified position readings to said identified point of connection; and processing said plurality of correlated position readings to obtain a reference location when connected to said communications network at said identified point of connection.

2. The method of claim 1 wherein processing said plurality of correlated position readings includes of averaging said plurality of position readings.

3. The method of claim 1 wherein processing said plurality of correlated position readings includes choosing one of said plurality of correlated position readings as said reference location.

4. The method of claim 1 wherein said communications network is a cellular telephone network and wherein said mobile communications device is a GPS-equipped cellular telephone.

5. The method of claim 1 further comprising the step of providing said reference location in response to a position request from an application.

6. The method of claim 1 further comprising the step of using said reference location as an aid for computing a final position using said GPS receiver in response to a position request from an application.

7. The method of claim 1 wherein qualifying said actual position readings comprises:

accessing a doppler estimator when said position readings from said GPS receiver are recorded; and discarding position readings obtained when said doppler estimator indicates a speed above said threshold.

8. A method for determining the quality of a computed reference location for a mobile communications device equipped with a GPS receiver comprising the steps of:

recording, over a period of time, a plurality of positions when connected to a particular identified connection point to a communications network;

estimating, based on the variance of said positions, the size of the geographic area associated with said particular identified connection point; and determining, when a request for position is received, if the quality of a computed reference location is sufficient, based on the possible deviation of said computed reference location from the actual location based on said estimated size of said geographic area associated with said particular identified connection point.

9. The method of claim 8 further comprising the step of obtaining an actual position fix from said GPS receiver if said quality of said computed position is insufficient.

* * * * *